W. H. WOERHEIDE.
READY ROOFING MATERIAL.
APPLICATION FILED OCT. 12, 1911.
1,055,848.  Patented Mar. 11, 1913.
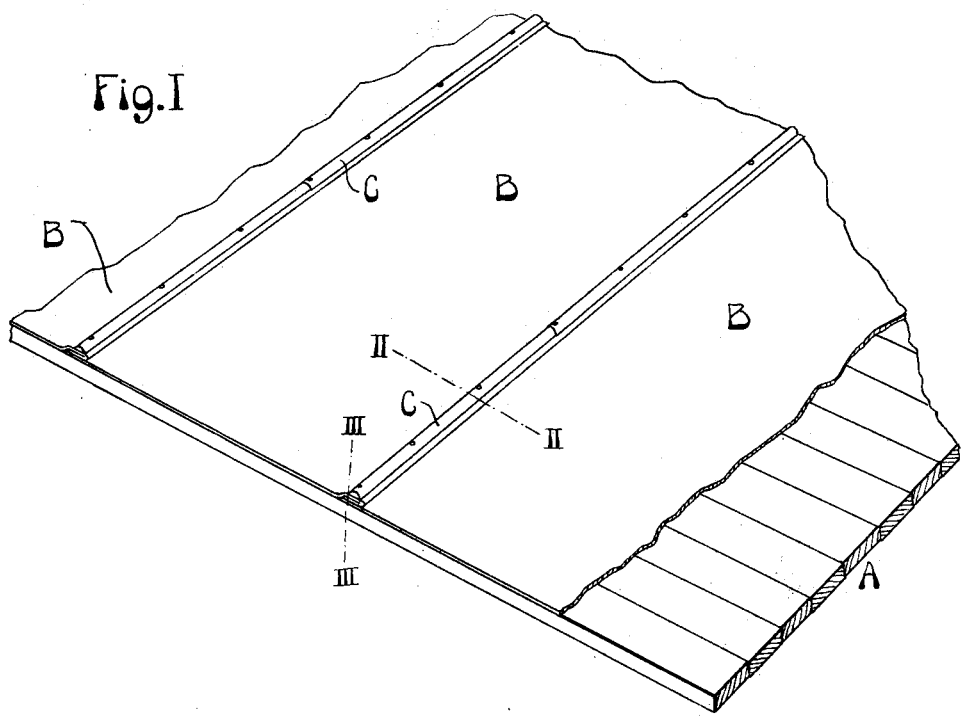
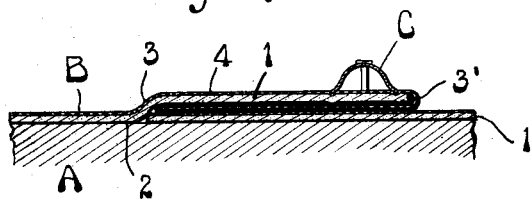
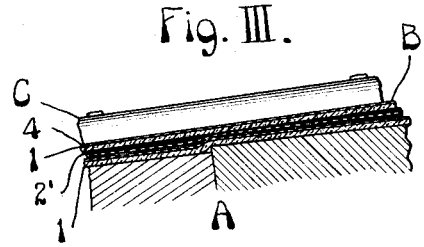
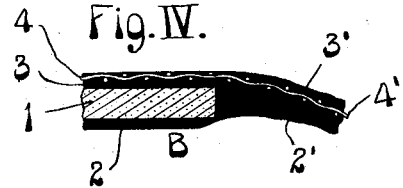
Attest
A. J. McCauley
E. B. Linn
Inventor:
W. H. Woerheide
by Knight & Cook
Attys.

UNITED STATES PATENT OFFICE.

WILLIAM H. WOERHEIDE, OF ST. LOUIS, MISSOURI.

READY-ROOFING MATERIAL.

1,055,848. Specification of Letters Patent. Patented Mar. 11, 1913.

Application filed October 12, 1911. Serial No. 654,332.

*To all whom it may concern:*

Be it known that I, WILLIAM H. WOERHEIDE, a citizen of the United States of America, and resident of the city of St. Louis and State of Missouri, have invented certain new and useful Improvements in Ready-Roofing Materials, of which the following is a full, clear, and exact description, reference being had to the accompanying drawings, forming part of this specification.

My invention relates to that character of roofing materials commonly known as prepared roofings, and which comprise a sheet of suitable material, such as wool felt, saturated and coated with soft asphalt compounds.

Prepared roofings of the kind referred to have been widely used in the roofs of buildings, such as factories, warehouses, barns, sheds, and the like, where the question of appearance of the roof was of no great importance, but have not been found suitable for use in the roofs of residences, churches, and other buildings, in which pleasing and sightly appearance are considered matters of importance, aside from the subject of durability and other qualities of the roofing material.

One of the objectionable characteristics of a prepared roofing material including an asphalt compound is that the asphalt compound, being black in color, is not such a color as is pleasing to the eye to render the roofing popular.

My invention has for its object to so construct a roofing material of the kind herein referred to as to make it feasible to apply paints of any desired colors to the surface of the roofing material without danger of the paint cracking, checking or peeling due to changes that take place in the plastic mass of asphalt owing to its expansion and contraction under changes of temperature.

I deem it important to here draw attention to the fact that roofing manufacturers have, for many years, endeavored by experiments to find a paint that would be suitable for use upon a roofing material surface comprising asphalt; but so far as I am aware, the results of all their efforts have been failures, due to the cracking, checking, or what is commonly known as "alligatoring" of the painted surfaces and the asphalt beneath such surfaces. The experiments to paint the roofing materials have, therefore, none of them met with success.

When prepared roofing material having an upper layer of asphalt compound is put into service on a roof, there exists a top layer of asphalt compound, the under portion of which is unset and is surrounded by a thin skin or film which becomes set and remains set while the asphalt compound beneath it remains plastic. This being true, it is apparent that, when the roofing material is in use in a roof and subjected to changes of temperature, there is unequal expansion and contraction of the adjoining unset and set portions of asphalt compound. The soft unset under portion of the compound expands during the heat of the day and contracts under the cooler atmosphere at night to much greater degree than the set top film, and, due to this unequal expansion and contraction, there is resultant cracking and checking of the top surface of the compound, which renders it unfit to receive and adequately hold a coating of paint.

It is not the aim of my present improvement to provide any particular or new paint, such as roofing manufacturers have endeavored in the past to find, which is suitable for application to roofing material, but rather to provide a roofing material with a means that will prevent the expansion and contraction of the unset portion of the top layer of asphalt from having any effect upon the set top film above it; hence, avoiding liability of the cracking of the top film; so that it is ready to receive and satisfactorily hold a coat of paint of any desired color immediately after the roofing material is laid in a roof.

Figure I is a perspective view of a fragment of a roof including sheathing boards and sheets of my prepared roofing laid thereon. Fig. II is an enlarged cross section taken on line II—II, Fig. I. Fig. III is an enlarged longitudinal section taken on line III—III, Fig. I. Fig. IV is a greatly enlarged cross section of a fragment of one of the roofing sheets at one of its side edges.

In the accompanying drawings: A designates sheathing boards of the roof, and B sheets of my prepared roofing laid upon said sheathing boards with the slope of the roof, the roofing sheets being laid in overlapping relation and being held by fastening strips C through which nails, or other suitable securing devices, are passed to extend into the sheathing boards.

Generally stated, the sheets B of prepared roofing comprise a body strip 1 of wool felt, or other suitable material, to the two faces of which bottom and top layers 2 and 3 of an asphalt compound are applied, the body strip being preferably first saturated and then coated with the asphalt compound according to the practice commonly in vogue in making prepared roofings of the kind to which my invention relates. My improvement does not pertain to the coating of the body layer with layers of asphalt compound and no invention *per se* is herein claimed for such a product.

With the object in view of avoiding the cracking or checking of the top film or stratum of the asphalt compound of my roofing material, I embed into the top asphalt compound layer 3 of the roofing sheets B, a sheet 4 of even open mesh, fine thread fabric, for illustration cheese cloth, this open mesh fine thread fabric sheet being located immediately at and embedded into the top surface of the asphalt compound and its mesh being filled with the asphalt compound. The location of the open mesh fine thread fabric sheet is such that there is only a top film of asphalt compound above it which will not be affected by expansion and contraction of the softer body of asphalt compound beneath and in its mesh, as so much of the asphalt compound as lies directly in line with the open mesh fine thread fabric sheet enters into the cells provided by the mesh of the fabric. By the positioning of the open mesh fine thread sheet of fabric, as stated, I separate the top film of asphalt compound from the unset asphalt compound beneath it, so that when expansion and contraction of the under unset asphalt compound takes place, or the under unset asphalt compound is alternately softened under heat rays of the sun and again becomes harder when not subjected to the heat rays, as at night, the top film is unaffected to any material degree by means of such expansion and contraction of the under unset compound. It is to be further noted that the fine thread fabric, by permitting the presence of the asphalt compound directly in the open mesh of the fabric, provides keys extending downwardly from the top film, which by reason of their being embedded in the fabric, in close juxtaposition to each other, serve in conjunction with the fabric to restrain the top film from any undue expansion and contraction, and cracking or checking of the top film that would result from undue expansion and contraction. The top film is, therefore, retained in such a condition as to afford a stable surface for the application and retention of paints, which set much harder than asphalt roofing compound, and consequently require a more stable surface than that furnished by a body of plastic asphalt compound that has not become set throughout.

I desire to state that I am well aware that it is not broadly new to utilize a woven fabric in prepared roofing material embodying the use of asphalt as a coating for wool felt and the like, and my improvement should not be confused with roofing materials such as have heretofore been made in which woven fabrics were employed. In the previous instances, burlap, canvas, and other coarse thread woven fabrics, were used, the object in their use being to strengthen or reinforce the roofing material. These fabrics are, however, entirely different in nature to the even open mesh fine thread fabric, such as cheese cloth, used in my roofing material, and it is impossible to gain the result I gain without using such even open mash fine thread fabric as I utilize. Burlap is entirely unsuited for use in my roofing material for the reason that its mesh is not uniform, it is sleazy, and its threads are of varying sizes without the slightest degree of firmness to maintain their relative positions. An outer film of asphalt cannot, therefore be keyed at uniformly distant points through burlap to an under layer or body of asphalt. The closely woven fabrics heretofore used are of such nature as to absolutely prevent the keying of the top film to the under layer of asphalt. When a roofing material having burlap therein is painted, there is lack of uniformity of resistance offered by the fabric to prevent checking or cracking of the paint, this being due to the unevenness of the mesh of the fabric, and its sleaziness; and where canvas or other closely woven fabric is used, there is insufficient keying action between the under layer of asphalt and the top film, hence no opportunity to prevent checking or cracking of the film, to prevent its peeling from the fabric. In contra-distinction to the results accomplishable in the use of the burlap and closely woven fabrics heretofore used, the even open mesh fabric employed in my roofing material affords opportunity for the top film of the asphalt being keyed with regularity and uniformity throughout the roofing material to the under unset body of asphalt, with a graduation in the condition of the asphalt between the set film and the under layer, and which extends through the key portions in the open mesh; hence the top film, when properly applied to the open mesh fabric, is prevented from being cracked or checked, due to expansion and contraction of the under unset asphalt, or from peeling from the fabric.

Another advantageous feature and a very important one in the use of the fine thread fabric utilized in my roofing material as compared with the use of fabrics of the kind heretofore employed in the asphalt compounds of materials is that of the fine thread fabric providing for a substantially uniform depth of the top film of asphalt compound above the fabric. In the use of burlap, canvas, and other fabrics previously employed, the threads are coarse and, as a consequence, these threads, where they cross each other in the weave of the fabric, furnish recesses of considerable depth into which the asphalt compound above the fabric enters, so that while the body of asphalt compound above the fabric may be in the main of a uniform depth, it is of much greater depth at the location of the recesses referred to. As a consequence, the asphalt compound overlying the fabric is of such un-uniform depth as to prevent the even setting and hardening of the compound. The fine thread fabric used in my roofing material contains very slight recesses where the threads cross each other, and, as a result, the top film which it is desired to paint and to have the paint adhere adequately thereto, is rendered of substantially uniform depth throughout its extent, and is thicker than substantially half the thickness of the cheese cloth thread will set and harden approximately uniformly at all points, as desired, in order that there will be no detrimental expansion and contraction of this film, such as takes place in the top layer of asphalt compound of the uniform depth incident to the use of cross thread fabrics.

I claim:—

A roofing material comprising a suitable backing, a layer of asphalt compound carried by said backing, and a sheet of even open mesh fabric of a fineness of thread and mesh substantially that of cheesecloth embedded into the top surface of such layer of compound, confining the major portion of this top layer of compound in the interstices of the open mesh fabric, thereby allowing only a mere film of compound over the fabric.

WILLIAM H. WOERHEIDE.

In the presence of—
E. B. LINN,
A. T. McCAULEY.